Oct. 18, 1966   E. J. EMERSON ETAL   3,279,154
GAS PURIFICATION APPARATUS
Filed Feb. 6, 1964
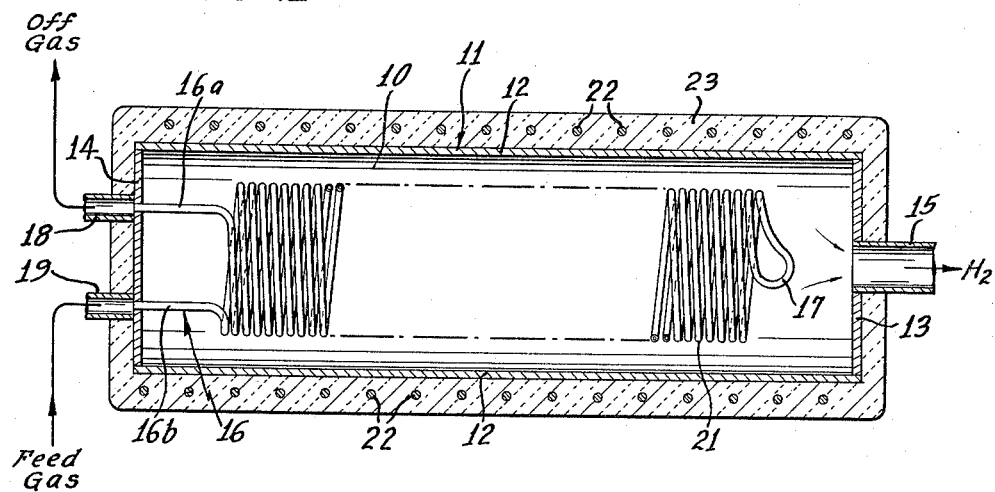
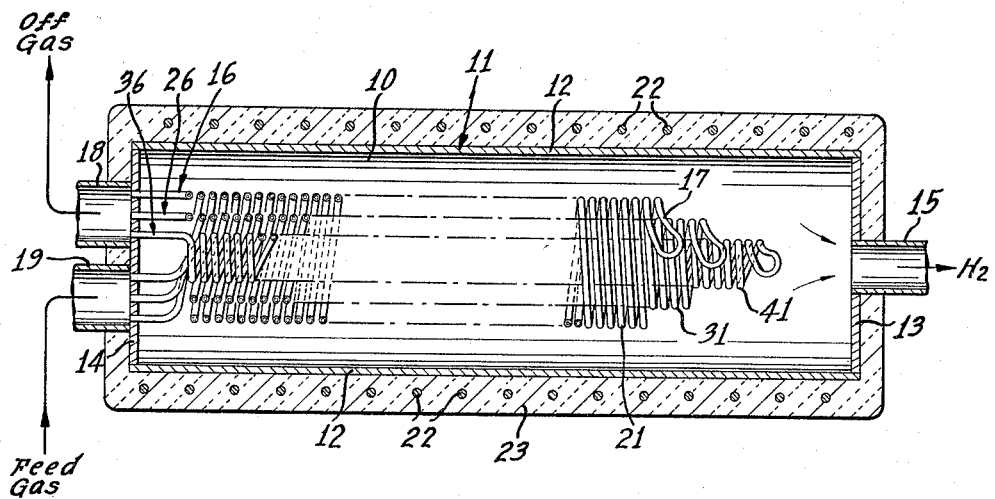
INVENTORS
Edward J. Emerson
Lionel Kantrowitz
BY Niels E. Scholer
John K. Conant
ATTORNEY 3,279,154
GAS PURIFICATION APPARATUS
Edward J. Emerson, Florham Park, Lionel Kantrowitz, Cliffside Park, and Niels E. Scholer, Union, N.J., assignors to Engelhard Industries, Inc., Newark, N.J., a corporation of Delaware
Filed Feb. 6, 1964, Ser. No. 342,965
2 Claims. (Cl. 55—158)

The present invention relates to apparatus for purifying gases such as hydrogen and oxygen and relates particularly to a novel construction for purification apparatus of the type in which the gas is purified by permeation of the gas through the walls of a metal tube or tubes.

It is a well-known phenomenon that certain gases such as oxygen and hydrogen permeate and diffuse through certain metals. For example oxygen diffuses through silver and hydrogen will diffuse through palladium and palladium alloys such as palladium-silver, palladium-boron, palladium-gold. A particularly suitable alloy for hydrogen diffusion is 75% palladium and 25% silver by weight.

This phenomenon is made use of in apparatus for purifying gases such as hydrogen or oxygen by bringing a gas mixture containing the gas to be purified into contact under heat and pressure with a thin non-porous wall of the metal through which the gas to be separated from the mixture will diffuse.

The present invention relates to diffusion purification apparatus in which the gas permeable metal walls are provided in the form of tubes and the invention is particularly adapted for apparatus of the "in-out" type which is explained in more detail below. For convenience, the apparatus in accordance with the invention will be described with reference to apparatus having palladium alloy tubes for the purification of hydrogen. It is to be understood, however, that the diffusion tubes may be made of other metals for purifying hydrogen or other gases without departing from the spirit and scope of the present invention.

Purification apparatus utilizing tubes of gas permeable metal are ordinarily one of two general types—the "in-out" type and the "out-in" type. In both, the diffusion tube (or tubes) extends into a chamber with the bore of the tube sealed from the chamber. In the "in-out" type impure feed gas containing hydrogen is fed into the bore of the tube under pressure and the hydrogen diffuses out through the walls of the tube into the chamber. In the "out-in" type the diffusion is in the opposite direction. The feed gas is fed into the chamber under pressure and the hydrogen diffuses into the bore of the tube.

The rate of diffusion is increased to a commercially practical level by heating the diffusion tubes and the feed gas brought in contact therewith and by creating a pressure differential between the inside and outside of the tubes.

A tube will normally withstand a greater internal than external pressure. "In-out" diffusion apparatus in which the greater pressure is applied inside the diffusion tubes may therefore be operated at a higher pressure differential and hence purify a larger volume of hydrogen per unit of tube surface during a given time at a given temperature than "out-in" apparatus in which the greater pressure is on the outside of the tubes.

In conventional "in-out" apparatus however each tube is normally secured and sealed through the walls of the chamber at two points—ordinarily at opposite ends of the chamber—since both ends of each tube open outside the chamber for feed gas containing hydrogen to be fed in one end and undiffused gas to flow out the other. Expansion and contraction of the tubes between the points at which the tubes are secured through the walls therefore exert severe stress on the seals through the walls. In some apparatus the tube is in the form of coils in the chamber to increase the amount of tubing, and hence the effective diffusion surface. In this case the pressurized gas in the coils exerts a Bourdon tube effect. That is the gas in the tube exerts pressure on the coils which tends to uncoil and straighten the coils. This results in severe torsional stress on the seals in apparatus of conventional design.

It is a principal object of the present invention to provide a novel construction for "in-out" type purification apparatus in which the serve stress applying to the seals around the diffusion tubes in conventional "in-out" apparatus is minimized.

In accordance with the invention the diffusion tube is doubled over so as to form two leg portions joined by a curved portion. Both leg portions are sealed through the same wall of the chamber and the leg portions within the chamber are helically coiled in the same direction. In operation this configuration relieves the torsional stress at the seals and permits expansion and contraction of the tubing within the chamber with minimum stress on the seals. In a preferred embodiment, the legs of the diffusion tube are coiled about a common axis with the coils of the respective legs being the same diameter and alternately intertwined.

One of the advantages of coiling the tube is that a greater area of tubing can be provided within the chamber and by having the tube coiled back on itself and attached through a single wall of the chamber, in accordance with the present invention, the coils are free to unwind to some extent and thereby avoid concentration of stress on the seals. In addition the intertwining of the coils of the respective legs tends to equalize the temperature between the leg into which the feed gas is fed and the other leg from which the undiffused gas exits. This equalization of temperature in different portions of the tube reduces stress between the different portions caused by varying pressures and temperatures along the length of the tube in the operation of the apparatus.

Further objects and advantages of the diffusion purification apparatus of this invention will be apparent from the following detailed description and accompanying drawings in which:

FIGURE 1 is a side view partly in section of a hydrogen purification apparatus in accordance with the present invention having a single diffusion tube, and;

FIGURE 2 is a view similar to the view of FIGURE 1 but showing the apparatus with a plurality of diffusion tubes therein.

Referring to the drawings the apparatus of the invention comprises generally a chamber 10 formed by a tank 11 having side walls 12 and end walls 13 and 14 with an outlet 15 from the chamber out through the end wall 13. The tank 11 and outlet 15 are suitably made of stainless steel. A diffusion tube 16 of non-porous hydrogen permeable metal, such as palladium or an alloy thereof, enters and exits from the chamber 10 through the end wall 14.

The diffusion tube 16 is formed of a length of tubing doubled back on itself to have two legs 16a and 16b with a curved connecting portion 17 between. The legs 16a and 16b may be sealed through the end wall 14 by welding or other conventional means and open respectively into header tubes 18 and 19 which are secured to the end wall 14. The legs 16a and 16b of the diffusion tube 16 thus open outside the chamber 10 and the bore of the tube is sealed from the chamber. The header tube 19 outside the chamber 10 is connected to a supply (not shown) of feed gas containing hydrogen and the off gas from the diffusion process flows out the header tube 18.

In FIGURE 1 only one diffusion tube 16 is shown in the chamber 10, but it will be appreciated that a plurality of diffusion tubes may be arranged in the chamber as illustrated in FIGURE 2. In this case additional tubes 26 and 36 would be of the same doubled over and coiled configuration as the tube 16 and connected to operate in the same manner but coils 31 and 41 of the additional tubes 26 and 36 are of different diameters in order for the coils of the additional tubes to fit concentrically inside the coils 21 of the tube 16. As shown the open ends of the tubes 16, 26 and 36 which are sealed through the end wall 14 open at one end into the header tube 19 for entry of the feed gas and open at the other end into the header tube 18 for the exit of the gas.

As previously mentioned the rate of diffusion is increased by heat and by creating a pressure differential between the bore of the tube 16 and the chamber 10. The pressure differential is normally created by pumping the feed gas into the diffusion tube 16 under pressure with conventional pumping apparatus (not shown). Heat may be applied to the chamber by electric resistance heating wires 22 embedded in a blanket of insulation 23 around the tank 11 or by other conventional heating means.

It is generally desirable to maintain the portion of the chamber 10 through which the ends of the tube 16 (and tubes 26 and 36) are sealed at a lower temperature than the main body of the chamber to reduce the stress on the seals due to expansion of the tube. Therefore, in addition to the other advantages of the construction of the present invention, it is simpler to maintain the zone adjacent the seals at a lower temperature than the body of chamber when both ends of the tube are sealed through the same end of the chamber as shown.

With the doubled back and coiled arrangement of the diffusion tube 16 described and shown the end of the series of coils at the connecting portion 17 of the tube is free to move longitudinally in the chamber and therby permit the expansion of the tube which is due to the heat applied and permit the coils 21 to unwind partially in response to the Bourdon effect of the pressure in the tube. The stresses on the tube and on the seals through the wall 14 caused by expansion and the Bourdon effect are thereby largely relieved.

In operation impure feed gas containing hydrogen is fed under pressure into the leg 16b of the diffusion tube 16. The gas flows through the coils 21 of the leg 16b, through the curved portion 17, through the coils of the leg 16a and out the header tube 18. The direction of gas flow in the additional tubes 26 and 36 shown in FIGURE 2 is of course the same as the flow through the tube 16. As the gas progresses through the diffusion tube 16 hydrogen in the gas permeates the walls of the tube and diffuses into the chamber 10 from which the pure hydrogen flows out the outlet 15 to the point of use or to suitable storage facilities.

The above description is of a preferred embodiment of the diffusion purification apparatus of this invention and it will be appreciated certain modifications may be made in the structure and arrangement without departing from the spirit and scope of the invention as defined by the following claims.

What is claimed is:

1. Apparatus for diffusion purification of a gas comprising a chamber having an outlet and a plurality of tubes in the chamber, said tubes being made of non-porous metal through which a particular gas permeates, each of said tubes being doubled back on itself to form two legs with a connecting portion between, said interconnecting portion being free to move within the chamber, each of said legs being secured through a wall of the chamber whereby the bores of the tubes open outside the chamber, a portion of both legs of each tube being coiled helically in the same direction about a common axis, the coils in both legs of each tube being substantially the same diameter and intertwined with successive coils of one leg adjacent coils of the other leg of the tube, the coils of the legs of the respective tubes being successively larger, and the respective tubes being arranged with the coils of successive tubes concentrically around the coils of the tube having the smallest diameter coils.

2. Apparatus as set forth in claim 1 in which said tube is made of non-porous hydrogen permeable metal.

References Cited by the Examiner
UNITED STATES PATENTS

| | | | |
|---|---|---|---|
| 2,300,634 | 11/1942 | Schoenfeld | 55—80 |
| 2,458,321 | 1/1949 | Unschuld | 55—80 |
| 2,536,610 | 1/1951 | King et al. | 55—158 |
| 2,911,057 | 11/1959 | Green et al. | 55—158 |

REUBEN FRIEDMAN, *Primary Examiner.*

J. ADEE, *Assistant Examiner.*